United States Patent
Takeuchi et al.

(10) Patent No.: US 10,697,530 B2
(45) Date of Patent: Jun. 30, 2020

(54) WORM WHEEL, ELECTRIC POWER STEERING SYSTEM, AND MANUFACTURING METHOD FOR WORM WHEEL

(71) Applicant: JTEKT CORPORATION, Osaka-shi, Osaka (JP)

(72) Inventors: Akihiro Takeuchi, Takahama (JP); Yu Suematsu, Kariya (JP); Yuji Wakugawa, Kashihara (JP); Yoshitomo Nagai, Kashihara (JP); Koji Okumura, Kariya (JP); Hiroshi Kutsumi, Takarazuka (JP)

(73) Assignee: JTEKT CORPORATION, Osaka-shi (JP)

( * ) Notice: Subject to any disclaimer, the term of this patent is extended or adjusted under 35 U.S.C. 154(b) by 202 days.

(21) Appl. No.: 15/646,197

(22) Filed: Jul. 11, 2017

(65) Prior Publication Data
US 2018/0017149 A1 Jan. 18, 2018

(30) Foreign Application Priority Data

Jul. 14, 2016 (JP) .................................. 2016-139340
Jul. 14, 2016 (JP) .................................. 2016-139341

(51) Int. Cl.
*F16H 55/22* (2006.01)
*B29C 45/00* (2006.01)
(Continued)

(52) U.S. Cl.
CPC ......... *F16H 55/22* (2013.01); *B29C 45/0025* (2013.01); *B29C 45/1459* (2013.01);
(Continued)

(58) Field of Classification Search
CPC ............... F16H 55/22; F16H 2055/065; B29C 45/0025; B29C 2045/0027;
(Continued)

(56) References Cited

U.S. PATENT DOCUMENTS

2009/0282939 A1* 11/2009 Rogowski ............... F16H 55/06
74/424.5
2012/0000307 A1 1/2012 Oolderink et al.
(Continued)

FOREIGN PATENT DOCUMENTS

EP 0657340 A1 6/1995
EP 1614935 A1 1/2006
(Continued)

OTHER PUBLICATIONS

Jan. 29, 2018 Extended European Search Report issued in Patent Application No. 17180996.5.

*Primary Examiner* — Zakaria Elahmadi
(74) *Attorney, Agent, or Firm* — Oliff PLC

(57) ABSTRACT

A worm wheel includes: a sleeve; and a toothed portion provided by injection molding so as to cover a part of the sleeve, the toothed portion including a first thick portion provided on a first side face, which is a surface of the sleeve on a side closer to an injection-mold gate in an axial direction, and a second thick portion provided on a second side face, which is a surface on an opposite side to the first side face. A central part, in the axial direction, of the outer peripheral surface of the sleeve projects in the radial direction relative to both ends in the axial direction. The first thick portion of the toothed portion has a smaller thickness in the axial direction than the second thick portion.

10 Claims, 5 Drawing Sheets

(51) Int. Cl.
*B29C 45/14* (2006.01)
*B62D 5/04* (2006.01)
 B29L 15/00 (2006.01)
 B29L 31/00 (2006.01)
 F16H 55/06 (2006.01)

(52) U.S. Cl.
 CPC .... *B62D 5/0454* (2013.01); *B29C 2045/0027* (2013.01); *B29L 2015/00* (2013.01); *B29L 2031/7754* (2013.01); *F16H 2055/065* (2013.01)

(58) Field of Classification Search
 CPC .............. B26C 45/1459; B62D 5/0454; B29L 2015/00; B29L 2031/7754
 See application file for complete search history.

(56) References Cited

U.S. PATENT DOCUMENTS

2012/0111144 A1* 5/2012 Wakugawa ......... B29C 45/0025
 74/640
2017/0152926 A1* 6/2017 Ikeda ...................... F16H 55/17

FOREIGN PATENT DOCUMENTS

| | | |
|---|---|---|
| JP | 2010-014253 A | 1/2010 |
| JP | 2015-155757 A | 8/2015 |
| WO | 2008/000220 A2 | 1/2008 |

* cited by examiner

WORM WHEEL, ELECTRIC POWER STEERING SYSTEM, AND MANUFACTURING METHOD FOR WORM WHEEL

INCORPORATION BY REFERENCE

The disclosure of Japanese Patent Application No. 2016-139340 filed on Jul. 14, 2016 and Japanese Patent Application No. 2016-139341 filed on Jul. 14, 2016, each including the specification, drawings and abstract, is incorporated herein by reference in its entirety.

BACKGROUND

1. Technical Field

The present disclosure a worm wheel, an electric power steering system, and a manufacturing method for a worm wheel.

2. Description of Related Art

An electric power steering system for steering steered wheels of a steering mechanism by transmitting a rotational force of a motor to the steering mechanism employs a worm speed reducer using a worm wheel described in Japanese Patent Application Publication No. 2010-014253 (JP 2010-014253 A), for example, so as to transmit a motor rotational force to the steering mechanism.

The worm wheel described in JP 2010-014253 A is constituted by a sleeve (a core metal portion 2 and an annulus portion 3) to be fitted to an output shaft such as a steering shaft of the steering mechanism, and a toothed portion provided by injection molding on an outer peripheral surface, which is a radial surface of the sleeve, so as to reach both side faces, which are axial surfaces of the sleeve. The toothed portion includes a tooth forming portion provided on the outer peripheral surface of the sleeve, and a thick portion provided on the both side faces of the sleeve. Further, the toothed portion has a rugged shape on the both side faces of the sleeve, and a relative rotation of the toothed portion to the sleeve is restricted through the engagement with a rugged portion reaching the outer peripheral surface of the sleeve.

Further, as described in Japanese Patent Application Publication No. 2015-155757 (JP 2015-155757 A), it is also possible to restrict a relative rotation of the toothed portion to the sleeve through the engagement with a through-hole such that the through-hole is provided so as to penetrate between the both side faces of the sleeve.

SUMMARY

The outer peripheral surface of the sleeve in the worm wheel described in JP 2010-14253 A is provided flat with respect to the axial direction. In this case, when the toothed portion is injection-molded, resin supplied in a die solidifies sequentially from a part making contact with the die, and a part closer to a core of a portion to become the toothed portion solidifies later. Accordingly, in a shrinkage course at the time when a part to become the tooth forming portion solidifies, an axially central part of the part on an outer peripheral surface side is pulled toward the sleeve in comparison with both ends, so that an amount (a sink amount) of deformation in a recessed shape increases. As a result, in an outer peripheral surface, which is a radial surface of the toothed portion in the worm wheel, the axial central part of the tooth forming portion is recessed in comparison with the both ends, which decreases accuracy of flatness of the outer peripheral surface of the toothed portion with respect to the axial direction.

Further, the thick portions of the toothed portion in the worm wheel described in JP 2010-14253 A have generally the same thickness in the axial direction. In this case, when a gate is placed on one of the both side faces of the sleeve and the toothed portion is injection-molded, resin supplied in a die is supplied sequentially from a side opposite to a side where the gage is placed in the sleeve, which causes a temperature difference between the thick portions in a part to become the toothed portion. Accordingly, a cooling speed of the resin thus supplied becomes different between parts to become the thick portions, and a sink amount on the side where the gate is placed becomes large, which causes a difference in the sink amount between the parts to become the thick portions. As a result, similarly to the above, in the tooth forming portion in the worm wheel, the side where the gate is placed is recessed in comparison with the other side, which decreases accuracy of flatness of the outer peripheral surface of the toothed portion with respect to the axial direction. Such a problem is not limited to the worm wheel to be employed in the electric power steering system, but also occurs in a worm wheel obtained such that a toothed portion is injection-molded on a sleeve.

Both axial sides of the outer peripheral surface of the sleeve in the worm wheel in JP 2010-14253 A have a rugged shape due to the rugged portion. In this case, when the toothed portion is injection-molded, the both axial sides of the outer peripheral surface of the sleeve, in particular, are pulled toward the sleeve due to the rugged shape, thereby resulting in that a deformation amount (a sink amount) in a recessed shape varies. As a result, in the outer peripheral surface, which is a radial surface of the toothed portion in the worm wheel, accuracy of flatness of the outer peripheral surface of the toothed portion with respect to the axial direction decreases particularly on the both axial sides of the outer peripheral surface of the sleeve.

In this regard, in a case where the through-hole penetrating between both side faces of the sleeve is provided like the worm wheel in 2015-155757, both axial sides of the outer peripheral surface of the sleeve do not have a rugged shape, which makes it possible to restrain a decrease in accuracy of flatness of the outer peripheral surface of the toothed portion with respect to a circumferential direction. However, the worm wheel of JP 2015-155757 A is formed such that a reaction mixture of a polymer and the like is polymerized. Accordingly, when the toothed portion is injection-molded on the sleeve having the through-hole penetrating between the both side faces like JP 2015-155757 A, resin supplied through the through-hole of the sleeve and resin supplied through an outer peripheral surface side of the through-hole of the sleeve are joined to each other on the outer peripheral surface side, which causes a weld line, which is unique to the injection molding. A part where the weld line is formed is a weakest part in the toothed portion, which decreases strength and durability of the toothed portion. Such a problem is not limited to the worm wheel to be employed in the electric power steering system, but also occurs in a worm wheel obtained such that a toothed portion is injection-molded on a sleeve.

The present disclosure has been accomplished in consideration of such circumstances, and an object of the present disclosure is to provide a worm wheel, an electric power steering system, and a manufacturing method for a worm wheel, which restrain a decrease in accuracy of flatness of an outer peripheral surface of a toothed portion with respect to an axial direction, which restrain a decrease in accuracy of flatness of the outer peripheral surface of the toothed portion with respect to a circumferential direction, and which restrain a decrease in strength and durability.

A worm wheel according to a first aspect of the present disclosure includes: a sleeve having an annular shape; and a toothed portion provided by injection molding so as to cover a part of the sleeve, the toothed portion including a tooth forming portion provided on an outer peripheral surface, which is a surface of the sleeve in a radial direction, a first thick portion provided on a first side face, which is a surface of the sleeve on a side closer to an injection-mold gate in an axial direction, and a second thick portion provided on a second side face, which is a surface of the sleeve on an opposite side to the first side face in the axial direction. A central part, in the axial direction, of the outer peripheral surface of the sleeve projects in the radial direction relative to both ends in the axial direction. The first thick portion of the toothed portion has a smaller thickness in the axial direction than the second thick portion.

In the above aspect, the tooth forming portion is formed such that a central part thereof in the axial direction has a radial thickness smaller than that of both ends in the axial direction. Accordingly, in a shrinkage course at the time when a part to become the tooth forming portion solidifies, a part to become the central part in the axial direction, the part solidifying later than the other parts, can have a smaller sink amount to be pulled toward the sleeve side than parts to become the both ends. This is apparent from general findings that the sink amount is smaller as the thickness is smaller in injection molding.

Furthermore, the thick portions are configured such that a thickness of the second thick portion, which is distanced from the gate in comparison with the first thick portion, is larger than a thickness of the first thick portion provided on a side closer to the gate. On the account, in a course of supplying the resin into the parts to become the thick portions, the part to become the second thick portion, which is distanced from the gate in comparison with the first thick portion, can have a larger resin amount to be supplied therein in comparison with the part to become the first thick portion on the side closer to the gate. As a result, as apparent from the general findings, since the part to become the second thick portion has a large resin amount in comparison with the part to become the first thick portion, the sink amount in the part to become the second thick portion can be increased by just that much, thereby making it possible to decrease a difference in the sink amount between respective parts to become the thick portions.

As a result, it is possible to restrain the central part, in the axial direction, of the outer peripheral surface of the toothed portion from being recessed in comparison with the both ends in the axial direction and to restrain a part of the outer peripheral surface of the toothed portion on the first thick portion side from being recessed in comparison with a part on the second thick portion side. Accordingly, it is possible to restrain a decrease in accuracy of flatness of the tooth forming portion, that is, the outer peripheral surface of the toothed portion in the radial direction with respect to the axial direction.

Further, in the above aspect, a diameter of the outer peripheral surface of the sleeve may increase from the both ends toward the central part. With the above configuration, the thickness of the tooth forming portion in the radial direction is decreased from the both ends in the axial direction toward the central part. That is, the thickness of the tooth forming portion in the radial direction is decreased from a part where the resin supplied in the die solidifies early toward a part where the resin solidifies later, at the time of injection molding of the toothed portion. Accordingly, it is possible to more effectively restrain the central part, in the axial direction, of the outer peripheral surface of the toothed portion from being recessed in comparison with the both ends in the axial direction and it is possible to more appropriately restrain the decrease in accuracy of flatness of the outer peripheral surface of the toothed portion with respect to the axial direction.

Further, in the above aspect, the outer peripheral surface of the sleeve may be provided flat with respect to the circumferential direction. Similarly to the above, it is possible to more effectively restrain the outer peripheral surface of the toothed portion from changing irregularly and it is possible to more appropriately restrain the decrease in accuracy of flatness of the outer peripheral surface of the toothed portion with respect to the axial direction.

In the above aspect, the sleeve may have an engaging hole having a depth in the axial direction and provided in a part of at least one of the first side face and the second side face, the part being opposed to the thick portion of the toothed portion, and the thick portion opposed to the side face having the engaging hole, out of the first thick portion and the second thick portion, may engage with the engaging hole.

With the above configuration, a relative rotation of the toothed portion to the sleeve is restricted through the engagement between the thick portion and the engaging hole. In this case, when a constituent to restrict the relative rotation of the toothed portion to the sleeve is provided not on the outer peripheral surface of the sleeve, but on the side face, it is possible to maintain flatness of the outer peripheral surface of the sleeve with respect to the circumferential direction. Furthermore, the engaging hole of the sleeve is not a through-hole, but a hole having a depth. Hereby, even if the toothed portion is injection-molded, it is possible to restrain the decrease in accuracy of flatness of the outer peripheral surface of the toothed portion with respect to the circumferential direction. Besides, in this case, the resin supplied into the engaging hole provided in the sleeve and the resin supplied through a sleeve outer peripheral surface side of the engaging hole are not joined to each to each other on the outer peripheral surface side, so that a weld line is not formed. Accordingly, it is possible to restrain the decrease in accuracy of flatness of the outer peripheral surface of the toothed portion with respect to the circumferential direction and to restrain a decrease in strength and durability.

In the above configuration, the sleeve may have respective engaging holes having a depth in the axial direction and provided in respective parts of both the first side face and the second side face, the respective parts being opposed to the first thick portion and the second thick portion of the toothed portion, and the first thick portion and the second thick portion may engage with the respective engaging holes.

With the above configuration, a whirl-stop function to restrict a relative rotation of the toothed portion to the sleeve is added through the engagement between the thick portions and the engaging holes of the sleeve. Note that constituents to add the whirl-stop function are provided on both side faces of the sleeve. Accordingly, the outer peripheral surface of the sleeve can be provided as a flat surface that is flat with respect to the circumferential direction. Accordingly, even if the whirl-stop function is added, it is possible to restrain the decrease in accuracy of flatness of the outer peripheral surface of the toothed portion with respect to the axial direction.

In the above configuration, the engaging hole provided on the second side face may have a smaller depth in the axial direction than the engaging hole provided on the first side face.

With the above configuration, a difference between a distance from the gate to a bottom of the engaging hole on the first side face and a distance from the gate to a bottom of the engaging hole on the second side face can be made small in comparison with a case where the engaging holes on the both side faces have the same depth. Hereby, it is possible to reduce a difference in cooling speed of the supplied resin between the both side faces, thereby making it possible to decrease a difference in a sink amount between the both side faces. Accordingly, even if the whirl-stop function is added, it is possible to more appropriately restrain the decrease in accuracy of flatness of the outer peripheral surface of the toothed portion with respect to the axial direction.

An electric power steering system according to a second aspect of the present disclosure includes: the worm wheel; and a motor configured to generate a steering force to steer steered wheels of a steering mechanism. The worm wheel mechanically connects the steering mechanism to the motor so as to transmit the steering force generated by the motor to the steered wheels, and the steered wheels are steered when the steering force generated by the motor is transmitted to the steered wheels.

With the above aspect, with the use of the worm wheel which restrains a decrease in accuracy of flatness of the tooth forming portion, that is, the outer peripheral surface of the toothed portion with respect to the axial direction, which restrains a decrease in accuracy of flatness of the outer peripheral surface of the toothed portion with respect to the circumferential direction, and which restrains a decrease in strength and durability, it is possible to achieve improvement of transfer efficiency at the time when the steering force generated by the motor is transmitted to the steered wheels. Accordingly, it is possible to achieve an electric power steering system that can improve reliability in application of the steering force.

A third aspect of the present disclosure relates to a manufacturing method for a worm wheel obtained such that a toothed portion is injection-molded so as to cover a part of a sleeve having an annular shape, the toothed portion including a tooth forming portion on an outer peripheral surface, which is a surface of the sleeve in a radial direction, a first thick portion on a first side face, which is one surface of the sleeve in an axial direction, and a second thick portion on a second side face, which is a surface of the sleeve on an opposite side to the first side face in the axial direction, and the manufacturing method includes: placing the sleeve in a die so that a gate from which resin is injected is positioned on a side closer to the first side face of the sleeve, wherein a central part, in the axial direction, of the outer peripheral surface of the sleeve projects in the radial direction relative to both ends in the axial direction, and an axial interval between the first side face of the sleeve and an inner surface of the die, the inner surface being opposed to the first side face, is smaller than an axial interval between the second side face of the sleeve on an opposite side to the first side face and an inner surface of the die, the inner surface being opposed to the second side face; and supplying the resin into the die in a state where the sleeve is placed inside the die.

With the above aspect, it is possible to restrain the central part, in the axial direction, of the outer peripheral surface of the toothed portion from being recessed in comparison with the both ends and to restrain a part of the outer peripheral surface of the toothed portion on the first thick portion side from being recessed in comparison with a part thereof on the second thick portion side. In the worm wheel manufactured as such, a decrease in accuracy of flatness of the tooth forming portion, that is, the outer peripheral surface of the toothed portion with respect to the axial direction is restrained.

In the above aspect, the supplying may be performed on an engaging hole of the sleeve, the outer peripheral surface of the sleeve may be provided flat with respect to a circumferential direction, and the sleeve may have the engaging hole having a depth in the axial direction and provided in a part opposed to the thick portion of the toothed portion, the thick portion being opposed to at least one of the first side face and the second side face.

With the above configuration, even if the toothed portion is injection-molded, it is possible to restrain the decrease in accuracy of flatness of the outer peripheral surface of the toothed portion with respect to the circumferential direction and it is possible to manufacture the worm wheel without a weld line on the outer peripheral surface side of the engaging hole. In the worm wheel manufactured as such, the decrease in accuracy of flatness of the outer peripheral surface of the toothed portion with respect to the circumferential direction is restrained and the decrease in strength and durability is also restrained.

According to the present disclosure, it is possible to restrain the decrease in accuracy of flatness of the outer peripheral surface of the toothed portion with respect to the axial direction, to restrain the decrease in accuracy of flatness of the outer peripheral surface of the toothed portion with respect to the circumferential direction, and to restrain the decrease in strength and durability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
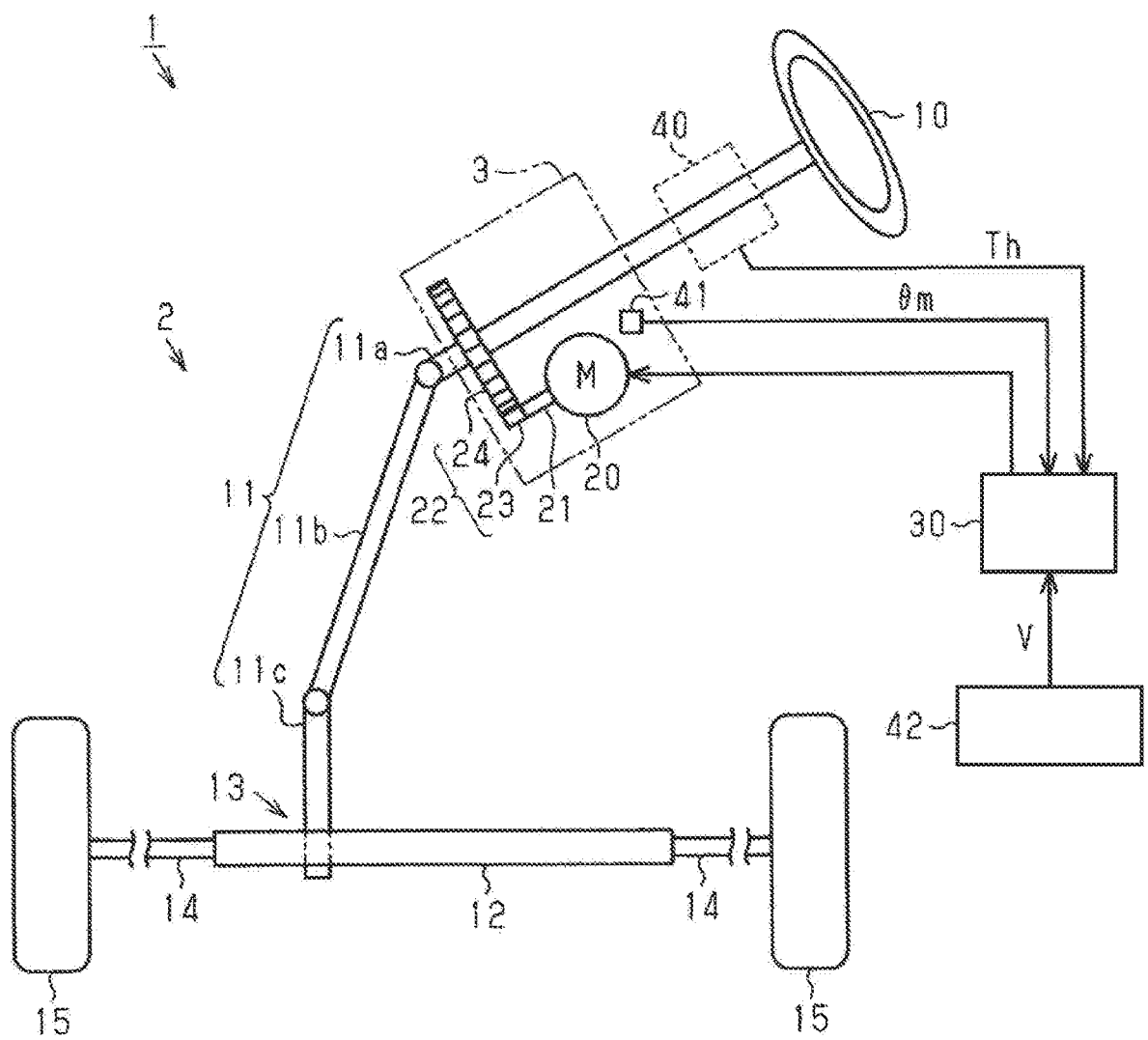
FIG. 1 is a configuration diagram illustrating a schematic configuration of an electric power steering system.

One embodiment of a worm wheel and an electric power steering system will be described below. As illustrated in FIG. 1, for example, a vehicle is provided with an electric power steering system (hereinafter referred to as the "EPS") 1 configured to apply an assist force to a steering mechanism 2 as a steering force to steer steered wheels 15. The EPS 1 gives the assist force in response to a steering operation of a user so as to assist the steering operation of the user.

The EPS 1 includes the steering mechanism 2 and an assist mechanism 3. The steering mechanism 2 includes a steering wheel 10, a steering shaft 11, a rack shaft 12, a rack-and-pinion mechanism 13, tie rods 14, and the steered wheels 15.

The steering shaft 11 includes a column shaft 11a, an intermediate shaft 11b, and a pinion shaft 11c. The column shaft 11a is connected to the steering wheel 10. The intermediate shaft 11b is connected to a lower end of the column shaft 11a. The pinion shaft 11c is connected to a lower end of the intermediate shaft 11b. The rack shaft 12 is connected to a lower end of the pinion shaft 11c via the rack-and-pinion mechanism 13.

Hereby, the steering shaft 11 rotates in conjunction with the steering wheel 10. A rotational motion of the steering shaft 11 is converted into a reciprocating linear motion of the rack shaft 12 in an axial direction (a right-left direction of FIG. 1) via the rack-and-pinion mechanism 13 connecting the pinion shaft 11c to the rack shaft 12. The reciprocating linear motion is transmitted to right and left steered wheels 15 via the tie rods 14 connected to both ends of the rack shaft 12, so that a steered angle of the steered wheels 15 is changed.

The assist mechanism 3 includes a motor 20 and a worm deceleration mechanism 22. The motor 20 includes a rotating shaft 21 configured to output a rotational force for rotation. For example, the motor 20 is a three-phase brushless motor that rotates based on a three-phase (U, V, W) driving electric power.

The worm deceleration mechanism 22 includes a worm shaft 23 and a worm wheel 24. The worm shaft 23 is connected to a tip end of the rotating shaft 21 of the motor 20. The worm wheel 24 is engaged with a worm of the worm shaft 23. Further, the worm wheel 24 is connected to the column shaft 11a of the steering shaft 11 in an integrally rotatable manner.

Hereby, a rotational force of the rotating shaft 21 of the motor 20 is transmitted to the column shaft 11a, and further to the rack shaft 12 via the worm shaft 23 and the worm wheel 24 (the worm deceleration mechanism 22). As such, the assist mechanism 3 converts the rotational force of the rotating shaft 21 of the motor 20 into a force to cause the rack shaft 12 to linearly reciprocate in the axial direction, via the worm deceleration mechanism 22. An axial force to be given to the rack shaft 12 becomes an assist force, so as to assist the steering operation of the user.

Note that a steering ECU 30 is connected to the motor 20. The steering ECU 30 controls driving (rotation) of the motor 20 based on detection results of various sensors provided in the vehicle. The various sensors include a torque sensor 40, a rotation angle sensor 41, and a vehicle speed sensor 42. The torque sensor 40 is provided in the column shaft 11a. The torque sensor 40 detects a torque value Th, which is value indicative of a magnitude and a direction of a steering torque, which is a load applied to the steering shaft 11 by the steering operation of the user. The rotation angle sensor 41 is provided in the motor 20. The rotation angle sensor 41 detects a motor angle θm of the rotating shaft 21 of the motor 20. The vehicle speed sensor 42 detects a vehicle speed value V, which is a vehicle running speed.

The steering ECU 30 sets a target assist torque (an assist force) based on the detection results of the sensors, and controls a current to be supplied to the motor 20 so that an actual assist torque reaches the target assist torque.

Figure 2:
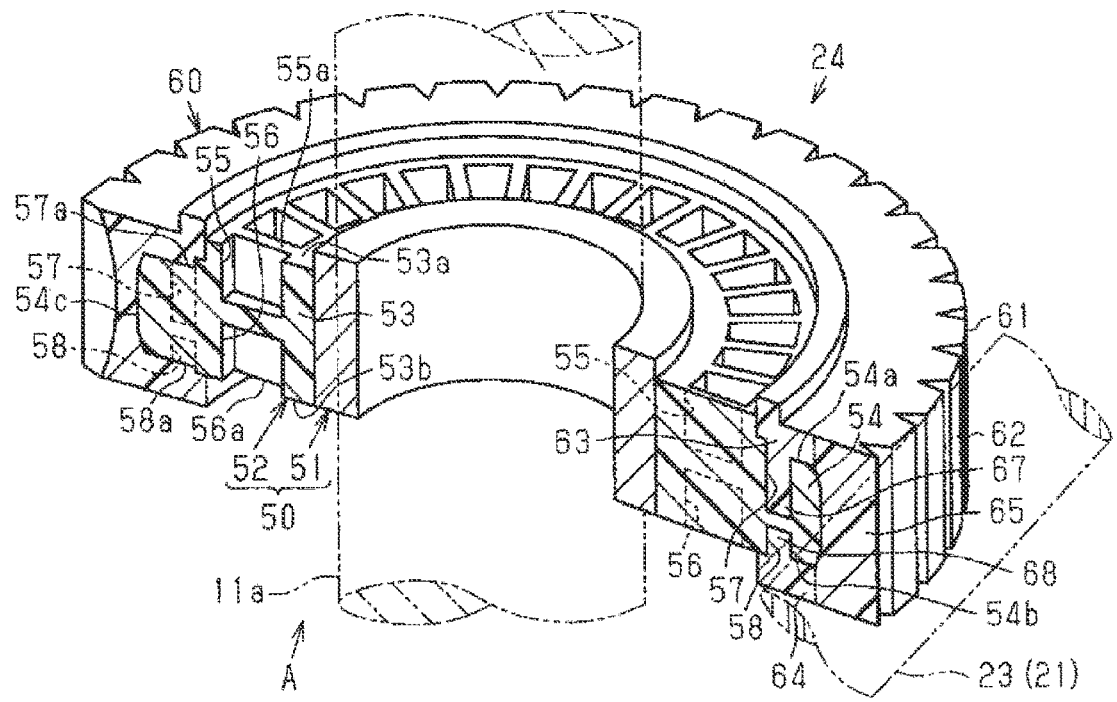
FIG. 2 is a sectional view illustrating a schematic configuration of a worm wheel of a worm speed reducer in an assist mechanism in terms of the electric power steering system.

Next will be described the configuration of the worm wheel 24 of the worm deceleration mechanism 22 in detail. As illustrated in FIG. 2, the worm wheel 24 includes a sleeve 50 and a toothed portion 60.

The sleeve 50 includes a boss 51 and an annular portion 52. The boss 51 is made of a metallic material such as stainless steel. The boss 51 has a cylindrical shape. The boss 51 is fitted to an outer peripheral surface of the column shaft 11a of the steering shaft 11 by press-fitting or the like. The annular portion 52 is made of a resin material such as synthetic resin. The annular portion 52 has a cylindrical shape. The annular portion 52 includes a first annular portion 53, which is a part having an axial length (thickness) longer than the other parts, and a second annular portion 54, which is a part having an axial length (thickness) smaller than the first annular portion 53. The annular portion 52 is integrated with the boss 51 by injection molding so as to cover a most axial part of an outer peripheral surface of the boss 51 in a radial direction.

The toothed portion 60 is made of a resin material such as synthetic resin. The toothed portion 60 has a cylindrical shape. A plurality of teeth 62 each having a tooth flank serving as a surface meshing with the worm of the worm shaft 23 is provided on an outer peripheral surface 61, which is a surface of the toothed portion 60 in the radial direction. Note that the outer peripheral surface 61 is constituted by vertexes of the teeth 62. The toothed portion 60 is integrated with the sleeve 50 by injection molding so as to cover the second annular portion 54 in the annular portion 52, which is a part of the sleeve 50, from the axial direction and the radial direction.

Figure 3:
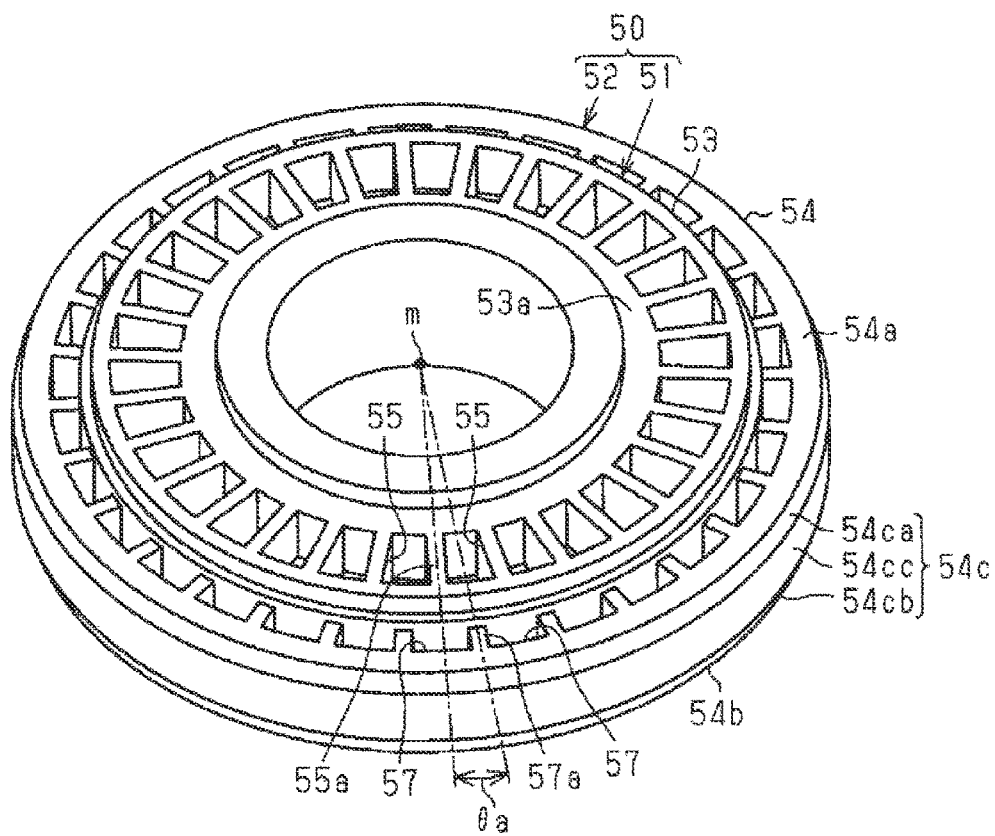
FIG. 3 is a perspective view illustrating a schematic configuration of a sleeve of the worm wheel.

Next will be described a configuration of the sleeve 50 further in detail. As illustrated in FIG. 2, FIG. 3, and, FIG. 4, which is a view seen from an arrow-A direction in FIG. 2, the first annular portion 53 includes a plurality of recessed portions 55, 56 in the sleeve 50. Each of the recessed portions 55 is opened on a first side face 53a, which is a surface on one side (an upper side in each figure) of the first annular portion 53 in the axial direction, and has a depth in the axial direction. Each of the recessed portions 56 is opened on a second side face 53b, which is a surface on a side (a lower side in each figure) opposite to the first side face 53a of the first annular portion 53 in the axial direction, and has a depth in the axial direction. The recessed portions 55, 56 are provided at regular intervals in a circumferential direction on respective side faces 53a, 53b. The recessed portions 55, 56 are placed in an opposed manner between the side faces 53a, 53b. Note that the recessed portions 55, 56 are bottomed holes that do not communicate (penetrate) between the side faces 53a, 53b. A depth (L1 in FIG. 4), which is a length from an opening of the recessed portion 55 to a bottom thereof and a depth (L2 in FIG. 4), which is a length from an opening of the recessed portion 56 to a bottom thereof are set to the same magnitude (L1=L2).

Note that, between the recessed portions 55 adjacent to each other in the circumferential direction, an inner rib 55a is defined by circumferential walls of the recessed portions 55. The same can be said about the recessed portions 56. Respective inner ribs 55a, 56a have a function to increase rigidity of the sleeve 50.

Figure 4:
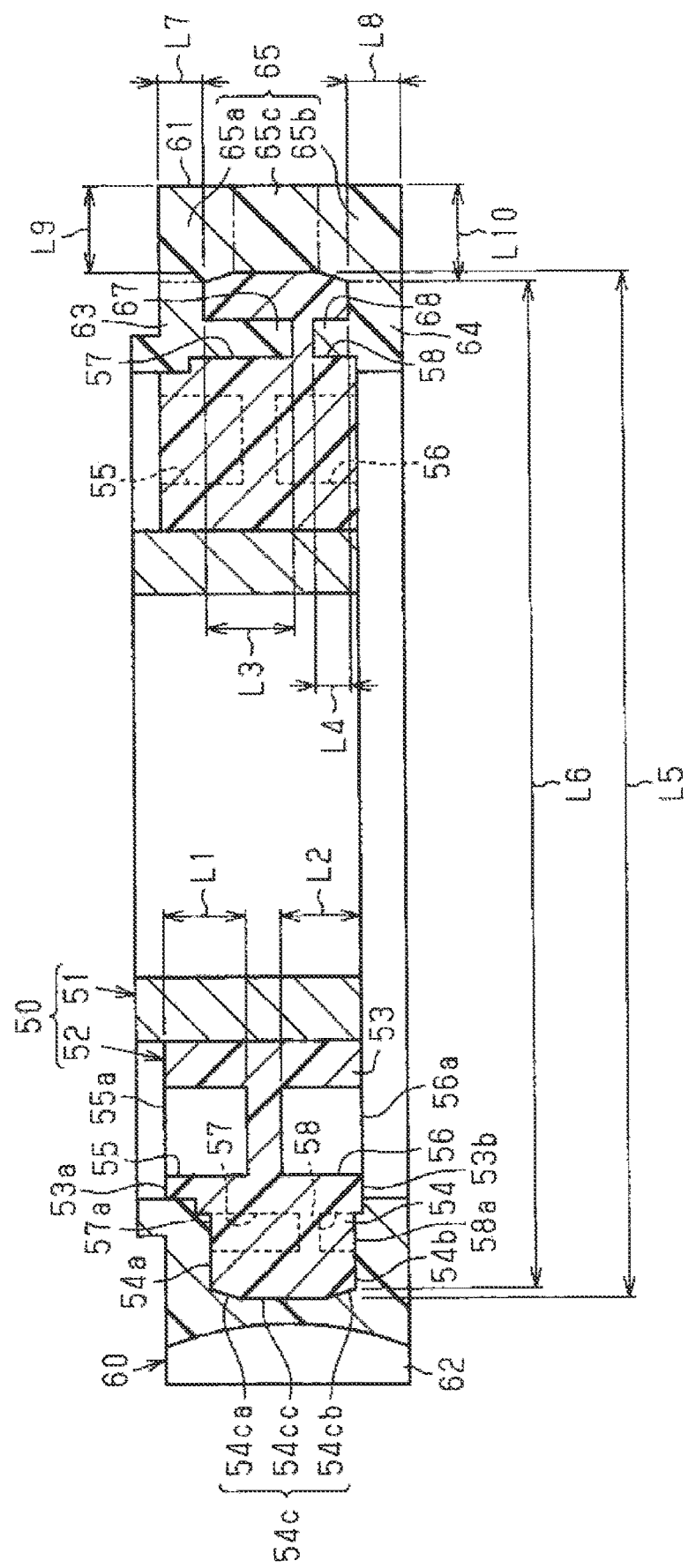
FIG. 4 is a sectional view illustrating a schematic configuration of the worm wheel when viewed from an arrow-A direction in FIG. 2.

Similarly, as illustrated in FIGS. 2, 3, and 4, the second annular portion 54 has a plurality of engaging holes 57, 58 in the sleeve 50. Each of the engaging holes 57 is opened on a first side face 54a, which is a surface on one side (an upper side in each figure) of the second annular portion 54 in the axial direction, and has a depth in the axial direction. Each of the engaging holes 58 is opened on a second side face 54b, which is a surface on a side (a lower side in each figure) opposite to the first side face 54a of the second annular portion 54 in the axial direction, and has a depth in the axial direction. The engaging holes 57, 58 are provided at regular intervals in the circumferential direction on respective side faces 54a, 54b. The engaging holes 57, 58 are placed in an opposed manner between the side faces 54a, 54b. Note that the engaging holes 57, 58 are bottomed holes that do not communicate (penetrate) between the side faces 54a, 54b. In terms of the engaging holes 57, 58, a depth (L4 in FIG. 4), which is a length of the engaging hole 58 provided on the second side face 54b from an opening thereof to a bottom thereof is set to be smaller than a depth (L3 in FIG. 4), which is a length of the engaging hole 57 provided on the first side face 54a from an opening thereof to a bottom thereof (L3>L4).

Note that, between the engaging holes 57 adjacent to each other in the circumferential direction, an outer rib 57a is defined by respective walls of the engaging holes 57 in the circumferential direction. The same can be said about the engaging holes 58. Respective outer ribs 57a, 58a have a function to increase the rigidity of the sleeve 50.

Further, as illustrated in FIG. 3, the inner ribs 55a of the first annular portion 53 and the outer ribs 57a of the second annular portion 54 are configured such that their phases (circumferential positions) in the circumferential direction are different from each other. More specifically, the inner ribs 55a and the outer ribs 57a are configured so as to be displaced from each other in the circumferential direction by an angle θa on the basis of an axial center m of the sleeve 50. Hereby, the inner ribs 55a are placed with respect to the outer ribs 57a such that each of the inner ribs 55a is placed between its adjacent outer ribs 57a. Further, the outer ribs 57a are placed with respect to the inner ribs 55a such that each of the outer ribs 57a is placed between its adjacent inner ribs 55a. The same can be said about the inner ribs 56a and the outer ribs 58a.

Here, a configuration of the second annular portion 54 is described further in detail with a configuration of the toothed portion 60. As illustrated in FIGS. 2, 3, and 4, the side faces 54a, 54b of the second annular portion 54 are provided flat with respect to a direction perpendicular to the axial direction of the sleeve 50. A central part 54cc, in the axial direction, of an outer peripheral surface 54c of the second annular portion 54 radially projects relative to both ends 54ca, 54cb thereof in the axial direction. That is, a diameter (L5 in FIG. 4) of the central part 54cc of the second annular portion 54 is set to be larger than a diameter of the both ends 54ca, 54cb (L6 in FIG. 4) (L5>L6). Hereby, a section of the second annular portion 54 in the arrow-A direction has a trapezoidal shape projecting radially outside the sleeve 50.

Note that the both ends 54ca, 54cb of the second annular portion 54 have an inclined surface that is inclined relative to the axial direction. The inclined surfaces of the both ends 54ca, 54cb are provided flat with respect to the circumferential direction. The central part 54cc of the second annular portion 54 has a flat surface that is flat with respect to the axial direction. The flat surface of the central part 54cc is also provided flat with respect to the circumferential direction.

The toothed portion 60 includes a first thick portion 63, a second thick portion 64, and a tooth forming portion 65. The first thick portion 63 is provided on the first side face 54a (an upper side in FIG. 4) of the second annular portion 54, on which the engaging holes 57 with a large depth are provided. That is, the first side face 54a is a part opposed to the first thick portion 63. The second thick portion 64 is provided on the second side face 54b (a lower side in FIG. 4) of the second annular portion 54, on which the engaging holes 58 with a small depth are provided. That is, the second side face 54b is a part opposed to the second thick portion 64. A thickness (L7 in FIG. 4) of the first thick portion 63 in the axial direction is set to be smaller than a thickness (L8 in FIG. 4) of the second thick portion 64 in the axial direction (L7<L8).

The tooth forming portion 65 is provided on the outer peripheral surface 54c (on right and left sides in FIG. 4) of the second annular portion 54. The outer peripheral surface 61 of the toothed portion 60, as a surface of the tooth forming portion 65, has a flat surface flush with the sleeve 50, namely, the axial direction of the worm wheel 24. The flat surface of the tooth forming portion 65 is provided also flat with respect to the circumferential direction.

Hereby, in the tooth forming portion 65, a tooth central part 65c provided on the central part 54cc of the outer peripheral surface 54c of the second annular portion 54 is set to have a small thickness in the radial direction in comparison with tooth end parts 65a, 65b provided on the both ends 54ca, 54cb of the outer peripheral surface 54c of the second annular portion 54, as much as the outer peripheral surface 54c of the second annular portion 54 projects radially outward. That is, a thickness (L9), in the radial direction, of the tooth central part 65c of the tooth forming portion 65 is set to be smaller than a thickness (L10) of the tooth end parts 65a, 65b in the radial direction (L9<L10).

Further, the thick portions 63, 64 have a plurality of engaging protrusions 67, 68. The engaging protrusions 67 extend from the first thick portion 63 toward the first side face 54a of the second annular portion 54, to which the engaging protrusions 67 are opposed. The engaging protrusion 67 is opposed to the engaging hole 57 provided in the second annular portion 54. That is, similarly to the engaging holes 57, the engaging protrusions 67 are provided at regular intervals in the circumferential direction. The same can be also said about the engaging protrusions 68 provided in the second thick portion 64. The engaging protrusions 67, 68 are injection-molded so as to bury the engaging holes 57, 58 opposed to them, so as to establish an engaged state through the integration with the engaging holes 57, 58.

Hereby, a whirl-stop function to restrict a relative rotation of the toothed portion 60 to the sleeve 50 is applied to the worm wheel 24 through the engagement between the engaging holes 57, 58 of the second annular portion 54 (the sleeve 50) and the engaging protrusions 67, 68 of the thick portions 63, 64.

Figure 5:
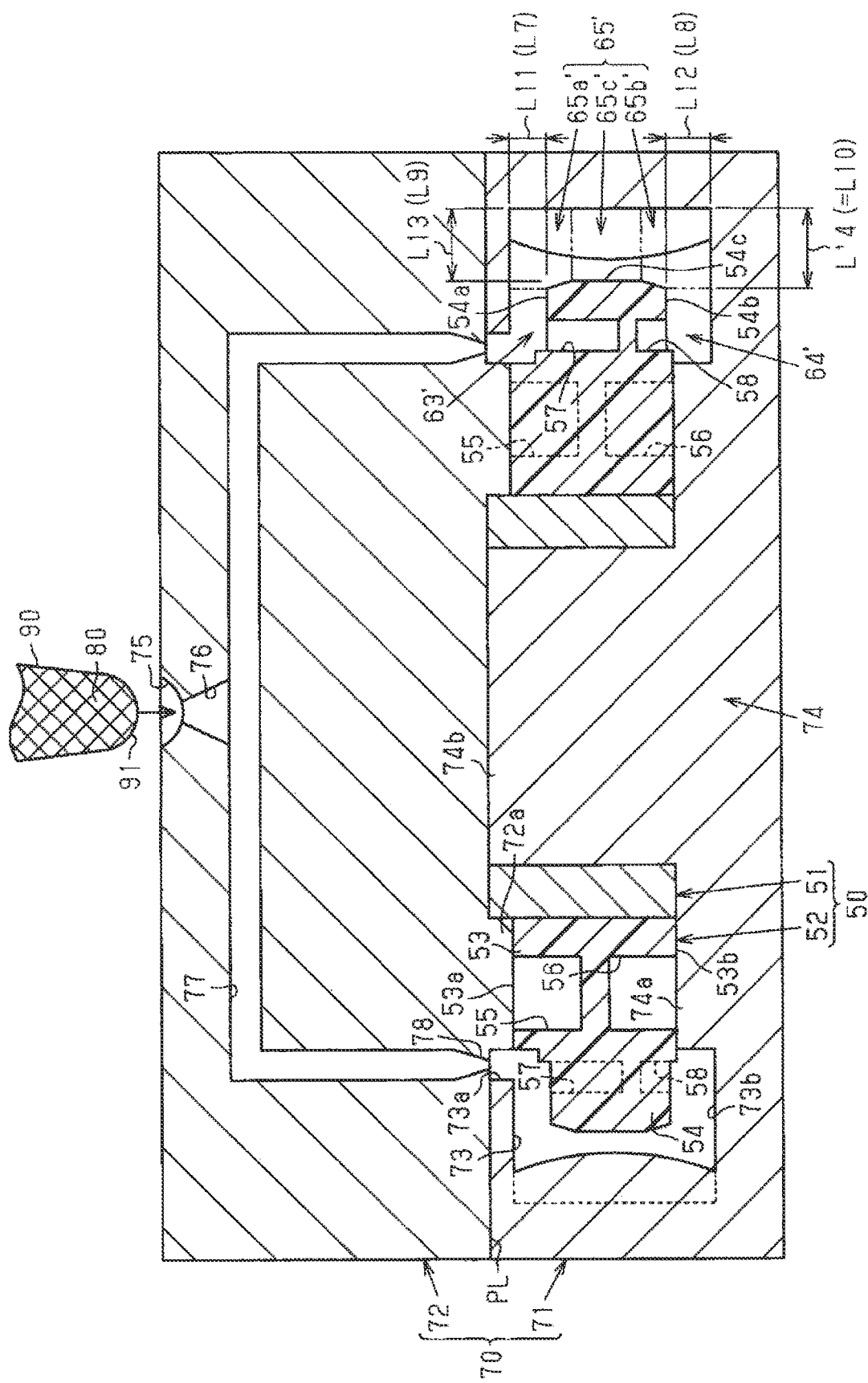
FIG. 5 is a sectional view to describe a manufacturing method for the worm wheel.

Next will be described a manufacturing method of the worm wheel 24. As illustrated in FIG. 5, the worm wheel 24 is manufactured such that a resin material 80 melted by a heater or the like is injected into a die 70, so that the toothed portion 60 is injection-molded integrally with the sleeve 50.

The die 70 includes a cavity 71 and a core 72. The cavity 71 and the core 72 are made of a metallic material such as steel. The cavity 71 and the core 72 are separated from each other at a parting line PL. The parting line PL is provided so as to have a rugged shape between the cavity 71 and the core 72.

The cavity 71 includes a mold portion 73 and a mold fixing base 74. The mold portion 73 is an internal space provided by cutting an inner part of the cavity 71. The mold portion 73 has an opening 73a opened on a side opposed to the core 72 of the cavity 71. The mold portion 73 is modelled to mold the toothed portion 60 such that the opening 73a is closed by the core 72 in a state where the sleeve 50 is placed inside the cavity 71.

The mold fixing base 74 includes a base portion 74a and a fixed portion 74b. The base portion 74a has a discoidal shape. The base portion 74a projects toward the opening 73a from a center of a bottom 73b opposed to the opening 73a of the mold portion 73. The base portion 74a is used to place the sleeve 50 inside the cavity 71. The fixed portion 74b has a columnar shape. The fixed portion 74b projects toward the opening 73a from a center of a part of the base portion 74a on a side opposed to the opening 73a. The fixed portion 74b is fitted to the boss 51 of the sleeve 50 so as to position and fix the sleeve 50 inside the cavity 71.

The core 72 includes a nozzle arrangement portion 75, a sprue 76, a runner 77, and a gate 78. The nozzle arrangement portion 75 is opened on an opposite side of the core 72 to a side opposed to the cavity 71. A nozzle 91 of an injector 90 for injecting the resin material 80 is placed in the nozzle arrangement portion 75. The sprue 76 is a tubular passage. The sprue 76 extends from the nozzle arrangement portion 75 toward the cavity 71. The runner 77 is a cylindrical passage. The runner 77 expands in a circular shape (a radial shape) from the sprue 76 along the parting line PL, and then extends toward the cavity 71. That is, the sprue 76 is a passage that connects the nozzle arrangement portion 75 to the runner 77. The gate 78 is a tubular passage. The gate 78 extends in a tapered shape from the runner 77 toward the cavity 71, so as to communicate with the mold portion 73 of the cavity 71.

Further, the core 72 includes a male die portion 72a. In a case where the opening 73a is closed by the core 72 in a state where the sleeve 50 is placed inside the cavity 71, the male die portion 72a closes the openings of the recessed portions 55 provided on the first side face 53a of the first annular portion 53. Note that the openings of the recessed portions 56 provided on the second side face 53b of the first annular portion 53 are closed by the base portion 74a of the mold fixing base 74. Hereby, the male die portion 72a and the base portion 74a restrict the resin material 80 from entering the recessed portions 55, 56 of the first annular portion 53. In this regard, the mold portion 73 communicates with the engaging holes 57, 58 of the second annular portion 54, so as to allow the resin material 80 to enter the engaging holes 57, 58.

As illustrated in FIG. 5, the sleeve 50 is placed inside the cavity 71, that is, in the mold portion 73, so that the first side face 54a of the second annular portion 54 is opposed to the gate 78. In this case, the first side face 54a of the second annular portion 54 is placed on a side closer to the gate 78 relative to the second side face 54b.

When the opening 73a is closed by the core 72 in a state where the sleeve 50 is placed as such, a first thick mold portion 63' corresponding to the first thick portion 63 of the toothed portion 60 is formed between the first side face 54a of the second annular portion 54 and an inner peripheral surface, of the mold portion 73, opposed to the first side face 54a. Further, a second thick mold portion 64' corresponding to the second thick portion 64 of the toothed portion 60 is formed between the second side face 54b of the second annular portion 54 and an inner peripheral surface, of the mold portion 73, opposed to the second side face 54b. A tooth mold portion 65' corresponding to the tooth forming portion 65 of the toothed portion 60 is formed between the outer peripheral surface 54c of the second annular portion 54 and an inner peripheral surface, of the mold portion 73, opposed to the outer peripheral surface 54c.

Note that, in the present embodiment, the first thick mold portion 63' is placed on a side closer to the gate 78 relative to the second thick mold portion 64'. Hereby, the first thick portion 63 corresponding to the first thick mold portion 63' is molded on the side closer to the gate 78 relative to the second thick portion 64 corresponding to the second thick mold portion 64'.

In the axial direction of the sleeve 50, an interval (L11 in FIG. 5) of the first thick mold portion 63' is set to be smaller than an interval (L12 in FIG. 5) of the second thick mold portion 64' (L11<L12). Note that the interval L11 is the same as the thickness L7 in FIG. 4 and the interval L12 is the same as the thickness L8 in FIG. 4.

In the radial direction of the sleeve 50, an interval (L13 in FIG. 5) of a tooth center mold portion 65c', of the tooth mold portion 65', corresponding to the tooth central part 65c is set to be smaller than an interval (L14 in FIG. 5) of both tooth end mold portions 65a', 65b', of the tooth mold portion 65', corresponding to the tooth end parts 65a, 65b (L13<L14). Note that the interval L13 is the same as the thickness L9 in FIG. 4 and the interval L14 is the same as the thickness L10 in FIG. 4.

Subsequently, after the sleeve 50 is placed in the mold portion 73 and a pressure is applied to perform clamping in a state where the opening 73a is closed by the core 72, the resin material 80 is injected to be supplied into the thick mold portions 63', 64' of the mold portion 73 and the tooth mold portion 65' from the injector 90 through the gate 78.

Figure 6:
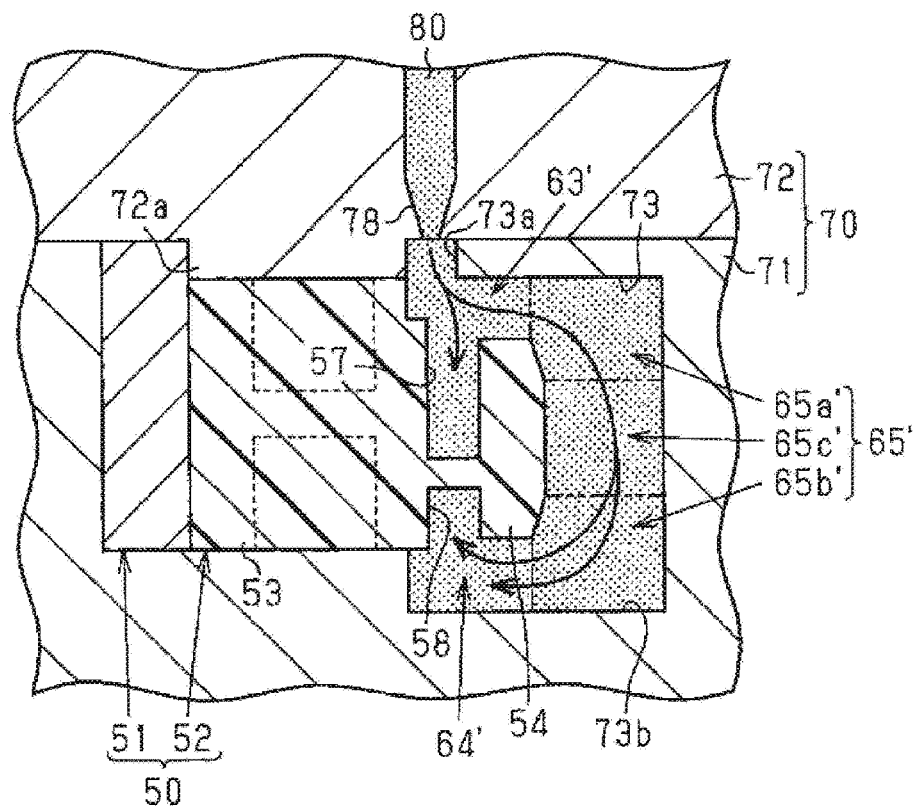
FIG. 6 is a view illustrating a state where resin flows in terms of the manufacturing method for the worm wheel.

As illustrated in an enlarged view of FIG. 6, the resin material 80 passes through between the male die portion 72a of the core 72 and the opening 73a of the cavity 71 from the core-72 side so as to be supplied by injection into the whole mold portion 73. The second thick mold portion 64', the tooth mold portion 65', and the first thick mold portion 63' are supplied with the resin material 80 in this order, and the resin material 80 is cooled off through the contact with the inner peripheral surface of the mold portion 73 so as to shrink and solidify in the order of supplying. In this case, the resin material 80 is supplied into the engaging hole 57 on the first thick mold portion 63' side and also supplied into the engaging hole 58 on the second thick mold portion 64' side between the engaging holes 57, 58. In the meantime, the resin material 80 supplied into the engaging hole 57 on the first thick mold portion 63' side and the resin material 80 supplied into the engaging hole 58 on the second thick mold portion 64' side through the outer peripheral surface 54c side of the engaging hole 57 are supplied without forming a joining part on the outer peripheral surface 54c side.

The resin material 80 shrinks and solidifies from the second thick mold portion 64' along a periphery of the inner peripheral surface of the mold portion 73, and finally, the resin material 80 shrinks and solidifies in a part of the tooth mold portion 65' around the second annular portion 54, the part being relatively distanced from the inner peripheral surface of the mold portion 73. That is, particularly the tooth center mold portion 65c' of the tooth mold portion 65' solidifies later than the other parts, i.e., the tooth end parts 65a, 65b.

After that, a unified product in which the toothed portion 60 is integrated with the sleeve 50 by injection molding is taken out of the die 70 (the cavity 71 and the core 72), and thus, the worm wheel 24 is finished.

Figure 7:
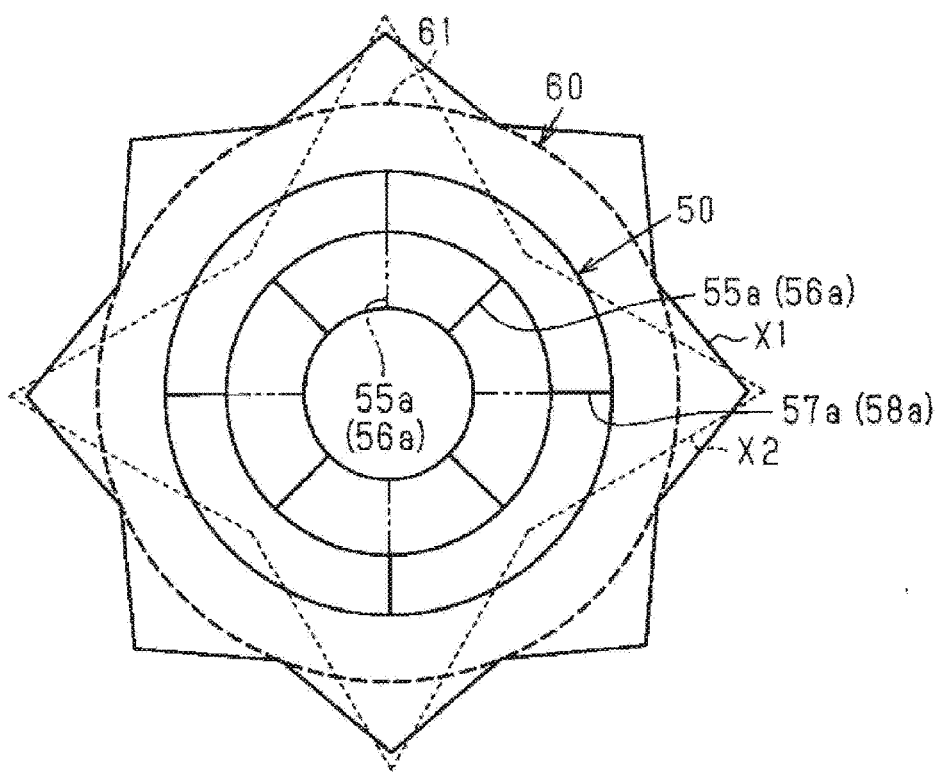
FIG. 7 is a view to describe roundness of a toothed portion in terms of the worm wheel.

Note that, in FIG. 7 in which the worm wheel 24 is illustrated in a simplified manner, the inner ribs 55a, 56a and the outer ribs 57a, 58a are configured such that their phases in the circumferential direction are different from each other. In this case, a virtual line X1 (indicated by a continuous line in FIG. 7) virtually indicating changes of irregularities of the outer peripheral surface 61 (indicated by a bold line in FIG. 7) of the toothed portion 60 with respect to the circumferential direction exhibits changes that project only by generally the same amount in the radial direction at respective parts where the inner ribs 55a, 56a and the outer ribs 57a, 58a are placed.

In this regard, as illustrated in FIG. 7 in which the inner ribs 55a, 56a are indicated by an alternate long and short dash line, the following assumes a case where the inner ribs 55a, 56a and the outer ribs 57a, 58a are configured such that their phases in the circumferential direction are the same. In this case, a virtual line X2 (indicated by a thin broken line in FIG. 7) virtually indicating changes of irregularities of the outer peripheral surface 61 of the toothed portion 60 with respect to the circumferential direction exhibits such a change that parts where the inner ribs 55a, 56a and the outer ribs 57a, 58a overlap with each other largely project in the radial direction in comparison with the virtual line X1. That is, a change amount of irregularities in the change of the virtual line X1 is restrained as compared with the change of the virtual line X2, so that the virtual line X1 is closer to a perfect circle. Accordingly, in comparison with a case where the inner ribs 55a, 56a and the outer ribs 57a, 58a have the same phase in the circumferential direction, the worm wheel 24 of the present embodiment is improved in flatness with respect to the circumferential direction of the outer peripheral surface 61 of the toothed portion 60, that is, accuracy in so-called roundness.

With the present embodiment described above, it is possible to obtain the following operation/working-effects. With the manufacturing method of the worm wheel of the present embodiment, it is possible to manufacture the worm wheel 24 which restrains the tooth central part 65c of the tooth forming portion 65, in the outer peripheral surface 61 of the toothed portion 60, from being recessed in comparison with the tooth end parts 65a, 65b and which restrains a part on the first thick portion 63 side, in the outer peripheral surface 61 of the toothed portion 60, from being recessed in comparison with a part on the second thick portion 64 side. In the worm wheel 24 manufactured as such, a decrease in accuracy of flatness of the tooth forming portion 65, that is, the outer peripheral surface 61 of the toothed portion 60 with respect to the axial direction is restrained.

More specifically, as illustrated in FIG. 4, in the worm wheel 24 of the present embodiment, the thickness (L9), in the radial direction, of the tooth central part 65c of the tooth forming portion 65 is set to be smaller than the thickness (L10) of the tooth end parts 65a, 65b.

Accordingly, as illustrated in FIG. 5, in a shrinkage course at the time when the resin material 80 supplied in the tooth mold portion 65' of the die 70 solidifies, it is possible to reduce a sink amount of the tooth center mold portion 65c' to be pulled toward the sleeve 50 side in comparison with the teeth end mold portions 65a', 65b', the tooth center mold portion 65c' solidifying later than the tooth end mold portions 65a', 65b' of the die 70. This is apparent from general findings that the sink amount is smaller as the thickness is smaller in injection molding.

Furthermore, as illustrated in FIG. 4, in the worm wheel 24 of the present embodiment, the thick portions 63, 64 are configured such that the thickness (L8) of the second thick portion 64, which is distanced from the gate 78 in comparison with the first thick portion 63 molded on the side closer to the gate 78 at the time of injection molding, is larger than the thickness (L7) of the first thick portion 63.

Accordingly, as illustrated in FIG. 5, in a course of supplying the resin into the thick mold portions 63', 64' of the die 70, the second thick mold portion 64', which is distanced from the gate 78 in comparison with the first thick mold portion 63', can have a larger resin amount of the resin material 80 to be supplied therein in comparison with the first thick mold portion 63' closer to the gate 78. As a result, as apparent from the general findings, since the second thick mold portion 64' of the die 70 has a large resin amount of the resin material 80 to be supplied therein in comparison with a part to become the first thick mold portion 63' of the die 70, the sink amount can be increased by just that much, thereby making it possible to decrease a difference in the sink amount between the thick mold portions 63', 64'.

As a result, it is possible to restrain the tooth central part 65c of the tooth forming portion 65, in the outer peripheral surface 61 of the toothed portion 60, from being recessed in comparison with the tooth end parts 65a, 65b and to restrain the tooth end part 65a on the first thick portion 63 side, in the outer peripheral surface 61 of the toothed portion 60, from being recessed in comparison with the tooth end part 65b on the second thick portion 64 side. Accordingly, it is possible to restrain a decrease in accuracy of flatness of the tooth forming portion 65, that is, the outer peripheral surface 61 of the toothed portion 60 with respect to the axial direction.

The worm wheel 24 has a whirl-stop function to restrict a relative rotation of the toothed portion 60 to the sleeve 50. Note that constituents to add the whirl-stop function, that is, the engaging holes 57, 58 of the second annular portion 54 (the sleeve 50) and the engaging protrusions 67, 68 of the thick portions 63, 64 are provided on the side faces 54a, 54b of the second annular portion 54 of the sleeve 50. Accordingly, the outer peripheral surface 54c of the second annular portion 54, which is the outer peripheral surface of the sleeve 50, can be formed as a flat surface that is flat with respect to the circumferential direction. Accordingly, even if the whirl-stop function is added, it is possible to restrain the decrease in accuracy of flatness of the outer peripheral surface 61 of the toothed portion 60 with respect to the axial direction.

In the present embodiment, the thickness of the tooth forming portion 65 in the radial direction is decreased from the tooth end parts 65a, 65b toward the tooth central part 65c. That is, the thickness of the tooth forming portion 65 in the radial direction becomes smaller from the second thick mold portion 64' of the die 70, in which the resin material 80 supplied in the die 70 solidifies early, toward the first thick mold portion 63' of the die 70, in which the resin material 80 solidifies later, at the time of injection molding of the toothed portion 60. Accordingly, it is possible to more effectively restrain the tooth central part 65c of the tooth forming portion 65, in the outer peripheral surface 61 of the toothed portion 60, from being recessed in comparison with the tooth end parts 65a, 65b and it is possible to more appropriately restrain the decrease in accuracy of flatness of the outer peripheral surface 61 of the toothed portion 60 with respect to the axial direction.

In the worm wheel 24, the outer peripheral surface 54c of the second annular portion 54 of the sleeve 50 is provided flat with respect to the circumferential direction. Accordingly, similarly to the above, it is possible to more effectively restrain the outer peripheral surface 61 of the toothed portion 60 from changing irregularly and it is possible to more appropriately restrain the decrease in accuracy of flatness of the outer peripheral surface 61 of the toothed portion 60 with respect to the axial direction.

In the manufacturing method of the worm wheel of the present embodiment, even if the toothed portion 60 is injection-molded, it is possible to restrain the decrease in accuracy of flatness of the outer peripheral surface 61 of the toothed portion 60 with respect to the circumferential direction and it is possible to manufacture the worm wheel 24 without a weld line on the outer peripheral surface 54*c* side of the engaging holes 57, 58. In the worm wheel 24 manufactured as such, the decrease in accuracy of flatness of the outer peripheral surface 61 of the toothed portion 60 with respect to the circumferential direction is restrained and a decrease in strength and durability is also restrained.

More specifically, as illustrated in FIG. 4, the worm wheel 24 of the present embodiment has a whirl-stop function to restrict a relative rotation of the toothed portion 60 to the sleeve 50. The constituents to add the whirl-stop function, that is, the engaging holes 57, 58 of the second annular portion 54 (the sleeve 50) and the engaging protrusions 67, 68 of the thick portions 63, 64 are provided not on the outer peripheral surface 54*c* of the second annular portion 54 of the sleeve 50, but on the side faces 54*a*, 54*b* thereof, thereby making it possible to maintain flatness of the outer peripheral surface 54*c* of the second annular portion 54 with respect to the circumferential direction. Furthermore, as illustrated in the figure, in the worm wheel 24 of the present embodiment, the engaging hole 57 of the second annular portion 54 is not a through-hole, but a hole (bottomed hole) having a depth.

Hereby, even if the toothed portion 60 is injection-molded, it is possible to restrain the decrease in accuracy of flatness of the outer peripheral surface 61 of the toothed portion 60 with respect to the circumferential direction. Besides, in this case, the resin material 80 supplied into the engaging hole 57 of the sleeve 50 and the resin material 80 supplied into the engaging hole 58 through the outer peripheral surface 54*c* side of the engaging hole 57 are not joined on the outer peripheral surface 54*c* side, so that a weld line is not formed. Accordingly, it is possible to restrain the decrease in accuracy of flatness of the outer peripheral surface 61 of the toothed portion 60 with respect to the circumferential direction and to restrain the decrease in strength and durability.

In the present embodiment, the constituents to add the whirl-stop function are provided on the side faces 54*a*, 54*b* of the second annular portion 54 of the sleeve 50, thereby making it possible to more appropriately yield an effect to restrict a relative rotation of the toothed portion 60 to the sleeve 50. Further, even in a case where the constituents to add the whirl-stop function are provided on the side faces 54*a*, 54*b* of the second annular portion 54 as such, the engaging holes 57, 58 are not provided on the outer peripheral surface 54*c* of the second annular portion 54, so that it is possible to maintain the flatness of the outer peripheral surface 54*c* of the second annular portion 54 with respect to the circumferential direction.

In the worm wheel 24, at the time of injection molding of the toothed portion 60, the depth of the engaging hole 57 on the first side face 54*a* of the second annular portion 54 is set to be larger than the depth of the engaging hole 58 on the second side face 54*b* of the second annular portion 54. Accordingly, at the time of injection molding of the toothed portion 60, a difference between a distance from the gate 78 to the bottom of the engaging hole 57 on the first side face 54*a* side of the second annular portion 54 and a distance from the gate 78 to the bottom of the engaging hole 58 on the second side face 54*b* side of the second annular portion 54 can be made small in comparison with a case where the engaging holes 57, 58 of the side faces 54*a*, 54*b* of the second annular portion 54 have the same depth. Hereby, it is possible to reduce a difference in the cooling speed of the supplied resin material 80 between the side faces 54*a*, 54*b* of the second annular portion 54, thereby making it possible to decrease a difference in a sink amount between the side faces 54*a*, 54*b*. Accordingly, even if the whirl-stop function is added, it is possible to more appropriately restrain the decrease in accuracy of flatness of the outer peripheral surface 61 of the toothed portion 60 with respect to the axial direction.

With the use of the worm wheel 24 of the present embodiment, which restrains the decrease in accuracy of flatness of the tooth forming portion 65, that is, the outer peripheral surface 61 of the toothed portion 60 with respect to the axial direction, which restrains the decrease in accuracy of flatness of the outer peripheral surface 61 of the toothed portion 60 with respect to the circumferential direction, and which restrains the decrease in strength and durability, it is possible to achieve improvement of transfer efficiency at the time when an assist force generated by the motor 20 is transmitted to the steered wheels 15. Accordingly, it is possible to achieve the EPS 1 that can improve reliability in application of the assist force.

Note that the above embodiment can be performed in the following manner. The flatness of the outer peripheral surface 54*c* of the second annular portion 54 with respect to the circumferential direction may be decreased as compared with the above embodiment, as long as it is possible to maintain the flatness of the outer peripheral surface 61 of the toothed portion 60 with respect to the axial direction.

The both ends 54*ca*, 54*cb* may have a flat surface with respect to the axial direction, for example, provided that the central part 54*cc* radially projects relative to the both ends 54*ca*, 54*cb* in the outer peripheral surface 54*c* of the second annular portion 54. Further, in a case where the shapes of the both ends 54*ca*, 54*cb* are adjusted, it is possible to adjust increase and decrease in the resin amount of the resin material 80 to be supplied between the thick mold portions 63', 64'. In this case, without making a structural change to the cavity 71 of the die 70, it is possible to adjust the difference in the sink amount between the thick mold portions 63', 64'.

The depths (L3, L4) of the engaging holes 57, 58 may be set to the same depth, or in terms of the relationship of the width or the like, the depth (L3) of the engaging hole 57 in the first side face 54*a* may be set to be smaller than the depth (L4) of the engaging hole 58 in the second side face 54*b* (L4>L3).

The whirl-stop function to restrict a relative rotation of the toothed portion 60 to the sleeve 50 may be achieved by providing the engaging holes only in either one of the side faces 54*a*, 54*b* of the second annular portion 54. Even in this case, it is possible to maintain the outer peripheral surface 54*c* of the second annular portion 54, which is the outer peripheral surface of the sleeve 50, to be flat with respect to the circumferential direction, thereby making it possible to yield an effect to restrain the decrease in accuracy of flatness of the outer peripheral surface 61 of the toothed portion 60 with respect to the axial direction.

The whirl-stop function to restrict a relative rotation of the toothed portion 60 to the sleeve 50 may be achieved such that a plurality of ribs is provided instead of providing the engaging holes 57, 58 of the second annular portion 54 and the plurality of ribs is buried in the toothed portion 60.

In the present embodiment, if a relative rotation of the toothed portion 60 to the sleeve 50 can be restricted by a bonding force of integration by injection molding, the configurations of the engaging holes 57, 58 and the engaging protrusions 67, 68 can be omitted. Note that, in this case, the recessed portions 55, 56 of the first annular portion 53 may be used as the whirl-stop function.

The gate 78 may be placed on the second side face 54b side of the second annular portion 54. Further, if the gate 78 is placed on either of the side faces 54a, 54b of the second annular portion 54, the gate 78 may be displaced to the outer peripheral surface 54c side or to the first annular portion 53 side or may be changed so that an injection direction of the resin material 80 becomes the radial direction.

The annular portion 52 may be made of a metallic material such as stainless steel. In this case, the boss 51 and the annular portion 52 may be integrated. The worm wheel 24 can be applied to a machine tool or the like, for example, as a device other than the electric power steering system, provided that the device includes the worm deceleration mechanism 22.

The embodiment embodies the disclosure in the form of the column-type EPS 1, but is not limited to this. For example, the disclosure may be embodied in the form of a rack-type EPS that applies an assist force to the rack shaft 12 via a rack-and-pinion mechanism provided separately from the rack-and-pinion mechanism 13. Further, the disclosure may be applied to a steer-by-wire (SBW) steering apparatus. Further, the disclosure is not limited to the steer-by-wire system, and may be embodied in the form of a rear wheel steering system and a four-wheel steering system (4WS).

What is claimed is:

1. A worm wheel comprising:
    a sleeve having an annular shape and:
        an outer peripheral surface, which is a surface of the sleeve in a radial direction, the outer peripheral surface having a central part, in an axial direction, that projects in the radial direction relative to both ends in the axial direction;
        a first side face which is a surface of the sleeve on a side closer to an injection-mold gate in the axial direction; and
        a second side face which is a surface of the sleeve on an opposite side to the first side face in the axial direction; and
    a toothed portion provided by injection molding so as to cover a part of the sleeve, the toothed portion having:
        a tooth forming portion provided on the outer peripheral surface;
        a first thick portion provided on the first side face; and
        a second thick portion provided on the second side face, the first thick portion having a smaller thickness in the axial direction than the second thick portion.

2. The worm wheel according to claim 1, wherein a diameter of the outer peripheral surface of the sleeve increases from the both ends toward the central part.

3. The worm wheel according to claim 1, wherein the outer peripheral surface of the sleeve is provided flat with respect to a circumferential direction.

4. The worm wheel according to claim 1, wherein:
    the sleeve has an engaging hole having a depth in the axial direction and provided in a part of at least one of the first side face and the second side face, the part being opposed to the thick portion of the toothed portion, and the thick portion opposed to the side face having the engaging hole, out of the first thick portion and the second thick portion, engages with the engaging hole.

5. The worm wheel according to claim 4, wherein:
    the sleeve has respective engaging holes having a depth in the axial direction and provided in respective parts of both the first side face and the second side face, the respective parts being opposed to the first thick portion and the second thick portion of the toothed portion, and the first thick portion and the second thick portion engage with the respective engaging holes.

6. The worm wheel according to claim 5, wherein the engaging hole provided on the second side face has a smaller depth in the axial direction than the engaging hole provided on the first side face.

7. The worm wheel according to claim 4, wherein the outer peripheral surface of the sleeve is provided flat with respect to a circumferential direction.

8. An electric power steering system comprising:
    the worm wheel according to claim 1; and
    a motor configured to generate a steering force to steer steered wheels of a steering mechanism,
    wherein the worm wheel mechanically connects the steering mechanism to the motor so as to transmit the steering force generated by the motor to the steered wheels, and
    the steered wheels are steered when the steering force generated by the motor is transmitted to the steered wheels.

9. The worm wheel according to claim 1, wherein the sleeve comprises:
    a boss composed of a first material; and
    an annular portion composed of a second material different from the first material and comprising the outer peripheral surface and inner ribs.

10. An assembly comprising:
    an injection mold having the injection mold gate; and
    the worm wheel according to claim 1 disposed in the injection mold.

* * * * *